(12) United States Patent
Rohs et al.

(10) Patent No.: US 6,286,390 B1
(45) Date of Patent: *Sep. 11, 2001

(54) TORSIONAL VIBRATION DAMPER

(75) Inventors: Ulrich Rohs; Hans Rohs, both of Düren; Dietmar Heidingsfeld, Aachen, all of (DE)

(73) Assignee: Rohs-Voigt Patentverwertungsgesellschaft mbH, Düren (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,477

(22) Filed: Dec. 22, 1998

(30) Foreign Application Priority Data

Dec. 23, 1997 (DE) .............................. 197 57 556
Dec. 23, 1997 (DE) .............................. 197 57 562
Feb. 28, 1998 (JP) .............................. 198 08 561

(51) Int. Cl.[7] .............................. F16F 15/10
(52) U.S. Cl. .............. 74/574; 192/205; 192/212
(58) Field of Search .............. 74/572, 574; 192/212, 192/205; 464/64, 67

(56) References Cited

U.S. PATENT DOCUMENTS

| | | | |
|---|---|---|---|
| 1,880,094 | * 9/1932 | Jacobson | 464/67 |
| 2,039,844 | * 5/1936 | Howland-Shearman | 464/67 |
| 2,476,043 | * 7/1949 | Hogan et al. | 464/67 |
| 3,952,545 | * 4/1976 | Koeslin | 464/67 |
| 4,674,991 | * 6/1987 | Tojima et al. | 464/64 |
| 4,996,892 | * 3/1991 | Yamamoto | 464/68 |
| 5,052,664 | * 10/1991 | Lesher et al. | 464/67 |
| 5,230,409 | * 7/1993 | Tanaka et al. | 464/67 |
| 5,355,747 | * 10/1994 | Kajitani et al. | 74/574 |
| 5,551,928 | * 9/1996 | Sudau | 74/574 |
| 5,562,542 | * 10/1996 | Rohrle | 464/67 |
| 5,624,317 | * 4/1997 | Schierling et al. | 464/68 |
| 5,771,755 | * 6/1998 | Duclos et al. | 464/67 |
| 5,779,550 | * 7/1998 | Annic et al. | 192/212 |
| 5,916,025 | * 6/1999 | Fenioux et al. | 464/67 |

FOREIGN PATENT DOCUMENTS 41 18 686   12/1992 (DE) .
195 44 832   6/1997 (DE) .

* cited by examiner

*Primary Examiner*—David A. Bucci
*Assistant Examiner*—Chong H. Kim
(74) *Attorney, Agent, or Firm*—Henry M. Feiereisen

(57) ABSTRACT

A torsional vibration damper, in particular for clutches, includes a primary structural unit and a secondary structural unit which are rotatable relative to one another and connected to each other by a spring arrangement (7) including at least one thrust piston (71). At least the secondary structural unit (2) interacts with the thrust piston (71) of the spring arrangement via a contact surface with a radially directed surface component, wherein the contact surface (4) is formed on a separate third structural unit (3) situated between the secondary structural unit (2) and the spring arrangement (7), thereby ensuring a structurally simple heat insulation for a torsional vibration damper.

13 Claims, 6 Drawing Sheets

TORSIONAL VIBRATION DAMPER

CROSS-REFERENCES TO RELATED APPLICATIONS

This application claims the priorities of German Patent Applications, Serial Nos. 197 57 556.0, filed Dec. 23, 1997, 197 57 562.5, filed Dec. 23, 1997, and 198 08 561.3 filed Feb. 28, 1998, the subject matters of which are incorporated herein by reference.

BACKGROUND OF THE INVENTION

The invention relates in general to a torsional vibration damper, and in particular to a torsional vibration damper, especially for couplings, and of a type including a primary structural unit and a secondary structural unit which are rotatable relative to one another and linked to each other by a spring arrangement incorporating at least one thrust piston, wherein at least the secondary structural unit interacts with the thrust piston of the spring arrangement via a contact surface with a radially directed surface component.

Such a torsional vibration damper is known, for example, from German Pat. No. 195 44 832 A1. This conventional torsional vibration damper includes a driving disk which partially overlaps a driven disk, and is formed on the inside of the overlapping part with radial pockets spaced about the periphery, with thrust pistons being situated inside the pockets and kept apart by at least one compression spring. The outer surface area of the driven disk has a polygonal cross section, and is in contact with the thrust piston. Thus, the outer surface area serves as a contact surface via which the driving disk so interacts with the spring arrangement comprised of the thrust piston and compression springs that the compression springs are compressed when the driving disk and driven disk are turned.

This torsional vibration damper is used in particular for couplings, with the driven disk being directly or indirectly connected with one of the friction surfaces.

SUMMARY OF THE INVENTION

It is thus an object of the present invention to provide an improved torsion vibration damper which has a structurally simple heat insulation.

This object, and others which will become apparent hereinafter, are attained in accordance with the present invention by providing a torsional vibration damper with primary and secondary structural units which are rotatable relative to one another and connected together by a spring arrangement which includes at least one thrust piston, wherein at least the secondary structural unit interacts with the thrust piston of the spring arrangement via a contact surface with a radially directed surface component, with the contact surface being formed on a separate third structural unit situated between the secondary structural unit and the spring arrangement.

Through the material transition from the secondary structural unit and separate third structural unit, which in and of itself already has an insulating effect, a heat insulation can be achieved in a structurally simple manner between the secondary structural unit and the spring arrangement, in particular the thrust pistons and the springs situated between the thrust pistons. This is particularly advantageous when the secondary structural unit is connected with a friction surface of a clutch, or exhibits such a friction surface.

In particular, the arrangement makes it possible to also use thrust pistons made of suitable material, such as plastics, whereby these materials are suitably selected to accomplish the task of achieving a wedging action and friction effect, without having to withstand excessive thermal loads.

The heat insulation can be further improved by only partially contacting the separate third structural unit with the secondary structural unit. In this way, the heat-transmitting overall surface between the third structural unit and the secondary structural unit is reduced, thereby increasing the thermal resistance between these two structural units. In order to comply with existing demands in conjunction with heat insulation and the stability of this arrangement, the separate third structural unit can be in partial contact with the secondary structural unit in an axial direction, i.e. parallel to the axis of rotation of the torsional vibration damper and/or in a peripheral direction.

In accordance to the present invention, the arrangement comprised of separate third structural unit and secondary structural unit can be configured in a structurally simple and yet stable manner, when the third structural unit includes at least one plate-shaped element which rests on a corresponding support surface of the secondary structural unit.

By configuring the separate third structural unit as a contact ring, the stability of the separate structural unit, and hence the stability of the entire arrangement can be further enhanced. In this context, it is also advantageous to provide the secondary structural unit with a support surface that radially supports the separate third structural unit, in particular if the third structural unit is of ring-shaped configuration. In this way, forces can be transmitted in a radial direction between the spring arrangement and the secondary structural unit, so as to avoid unnecessarily high axial forces for the torsional vibration damper according to the invention.

Suitably, the support surface of the secondary structural unit is smaller in an axial direction than the contact ring, so as to realize a partial contact in an axial direction between the separate structural unit and the secondary structural unit in a structurally simple manner. The secondary structural unit may also have projections which are spaced about the circumference for support of the contact ring, thereby establishing a partial contact between the secondary structural unit and the separate third structural unit in circumferential direction. Evidently, the aforementioned configurations may also be advantageously used in combination. In the event, the separate third structural unit is only placed on the secondary structural unit, the thermal resistance between the secondary structural unit and the separate third structural unit is maintained at a high level. It is also possible to only spotwise connect the separate structural unit with the secondary structural unit, so that the two structural units are in intimate contact at only these points. An intimate contact and hence good heat transfer between these two structural units, may be omitted if the separate structural unit and the secondary structural unit are so formed as to be positively joined together in circumferential direction.

It will be understood by persons skilled in the art that additional structural measures, such as recesses in the separate third structural unit, may be used to further increase the thermal resistance of the separate structural unit or between the secondary structural unit and the separate structural unit.

In order to ensure a sufficient stability of the separate structural unit even if the separate structural unit is only partially supported by the secondary structural unit, the separate structural unit may be made of metal, in particular of a less heat-conductive metal, such as special steel.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
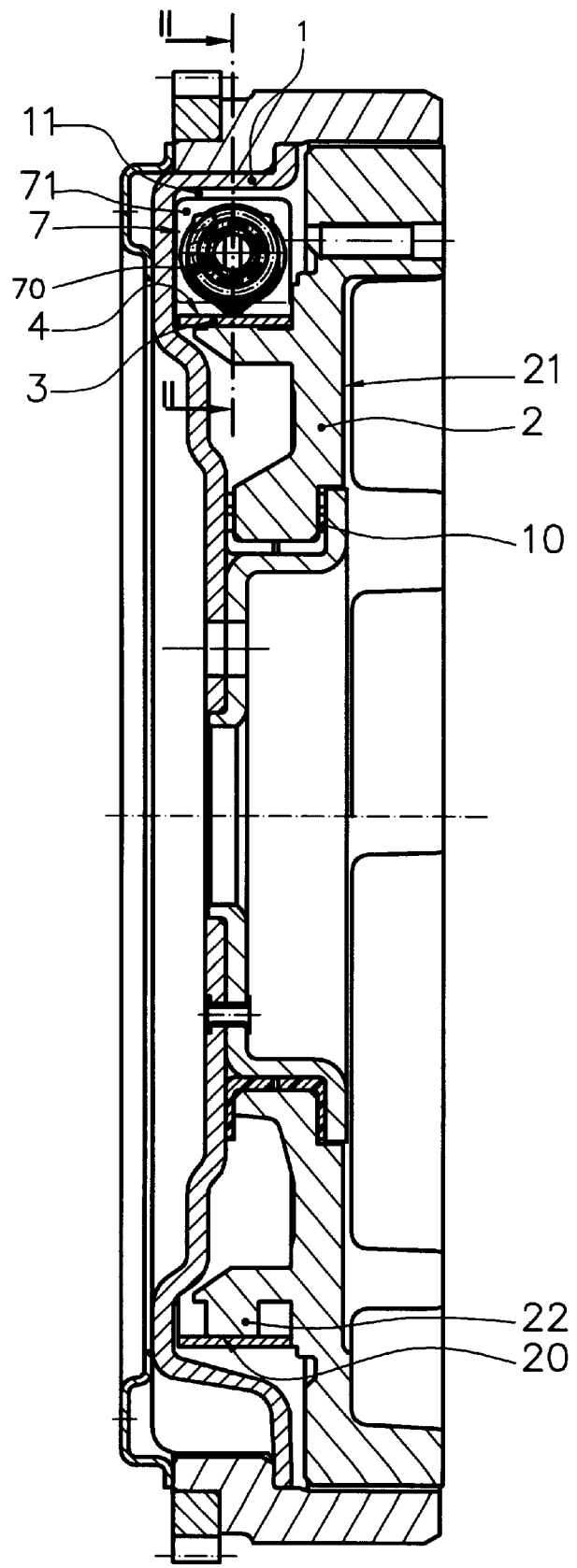
FIG. 1 is a sectional view of a first embodiment of a torsional vibration damper according to the present invention, with the upper half taken along the line I—I in FIG. 2, and the lower half taken along the line I'—I'n FIG. 2.

Throughout all the Figures, same or corresponding elements are generally indicated by same reference numerals.

Figure 2:
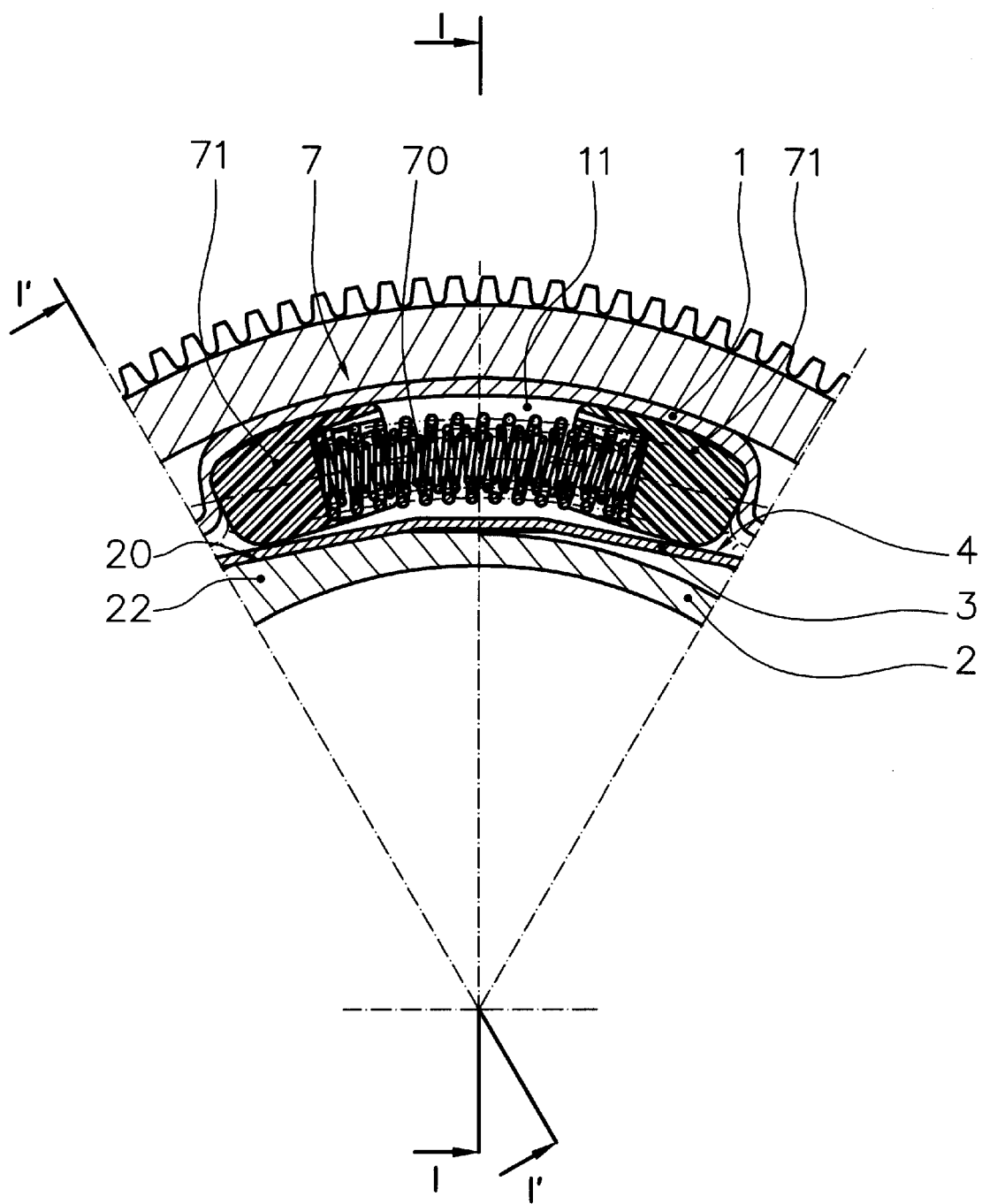
FIG. 2 is a sectional view of the torsional vibration damper of FIG. 1, showing on the left side a view taken along the line II—II in FIG. 1, and on the right side a view taken along the line II'—II' in FIG. 1.

Turning now to the drawing, and in particular to FIGS. 1 and 2, there are shown sectional views of a first embodiment of a torsional vibration damper according to the present invention, for use in a motor vehicle and situated e.g. between the internal combustion engine and an output unit, e.g. a clutch or transmission, for attenuating vibrations caused by the internal combustion engine. The torsional vibration damper includes a primary structural unit 1, for example in the form of a hollow disk, and a secondary structural unit 2, for example also a disk-shaped element, whereby the primary and secondary structural units 1, 2 are supported by a bearing 10 for rotation relative to one another. On its side facing away from the primary structural unit 1, the secondary structural unit 2 has a friction surface 21 which forms part of a clutch. A spring arrangement, generally designated by reference numeral 7 includes a plurality of tangentially arranged compression springs 70 which separate two thrust pistons or wedges 71, respectively, and are received together with the wedges 71 in circumferentially spaced pockets 11 of the primary structural unit 1 so as to resiliently couple the primary structural unit 1 with the secondary structural unit 2.

A contact ring 3 with a polygonal shape is provided as a separate third structural unit between the primary structural unit 1 and secondary structural unit 2. The outside peripheral surface of the contact ring 3 serves as a contact surface 4 via which the separate third structural unit or contact ring 3 as well as the secondary structural unit 2 interact with the spring arrangement 7. Through compression of the springs 70 and friction of the wedges 71 as a result of i.a. a rotation of the secondary structural unit 2 and thus of the contact surface 4, relative to the primary structural unit 1, vibrations are attenuated.

As shown in FIGS. 1 and 2, the separate structural unit in the form of the contact ring 3 is supported by a support surface 20 of a projection 22 which extends out of the secondary structural unit 2. This projection 22 is smaller in an axial direction than the contact ring 3, so that the contact ring 3 is only in partial contact with the secondary structural unit 2 in an axial direction. The radial thickness of the projection 22 varies over the periphery such that the radial thickness of the projection 22 is greatest in the area of the wedges 71, and smallest in the middle of the springs 70 (cf. FIG. 2). This type of configuration is possible without any appreciable reduction in thermal resistance, since the contact ring 3 does not contact the wedges 71 in the area of the springs 70, so that no appreciable heat transport takes place in these regions. The support surface 20 supports the contact ring 3 in a radial direction, and complements the polygonal shape of the contact ring 3. This ensures a positive fit effective in the circumferential direction between the contact ring 3 and the secondary structural unit 2, so that the contact ring 3 may only rest against the support surface 20.

Figure 3:
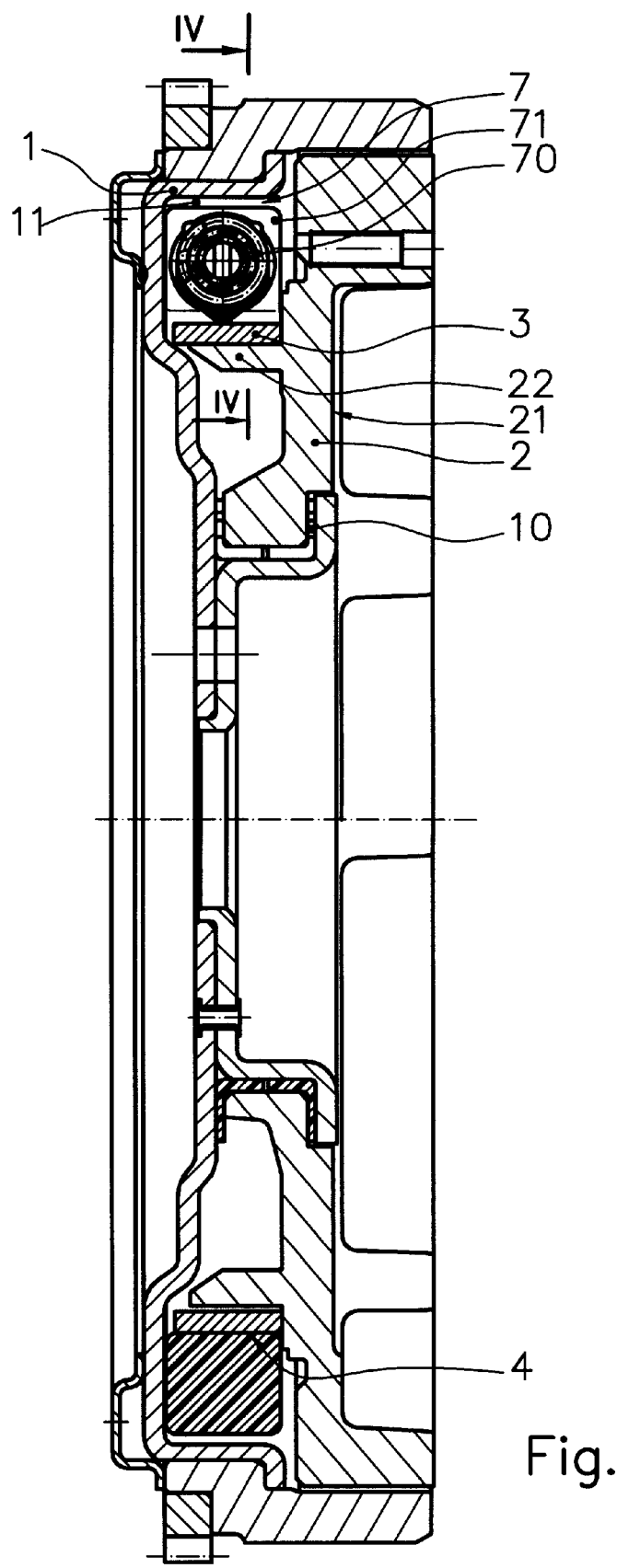
FIG. 3 is a sectional view of a second embodiment of a torsional vibration damper according to the present invention, with the upper half taken along the line III—III in FIG. 4, and the lower half taken along the line III'—III' in FIG. 4.
Figure 4:
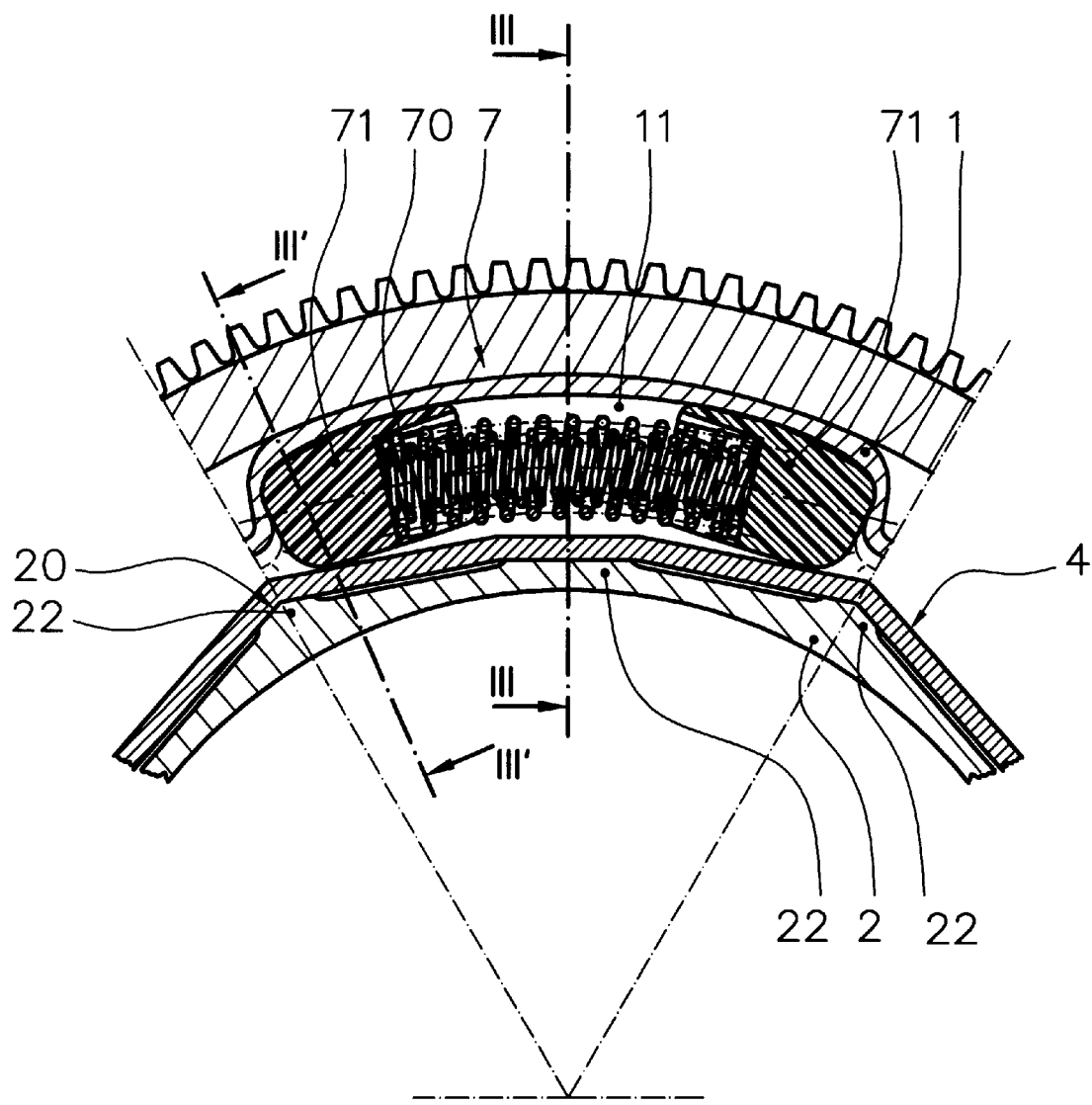
FIG. 4 is a sectional view of the torsional vibration damper of FIG. 3, taken along the line IV—IV.
Figure 5:
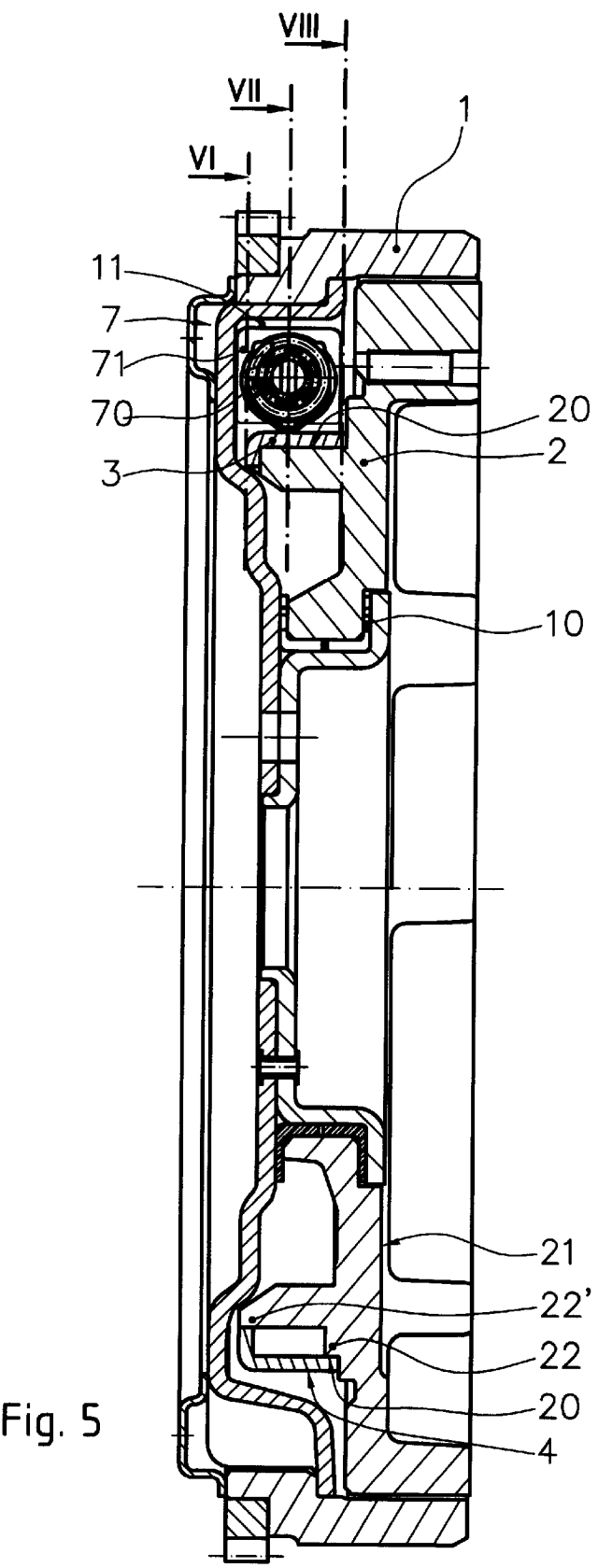
FIG. 5 is a sectional view of a third embodiment of a torsional vibration damper according to the present invention.
Figure 6:
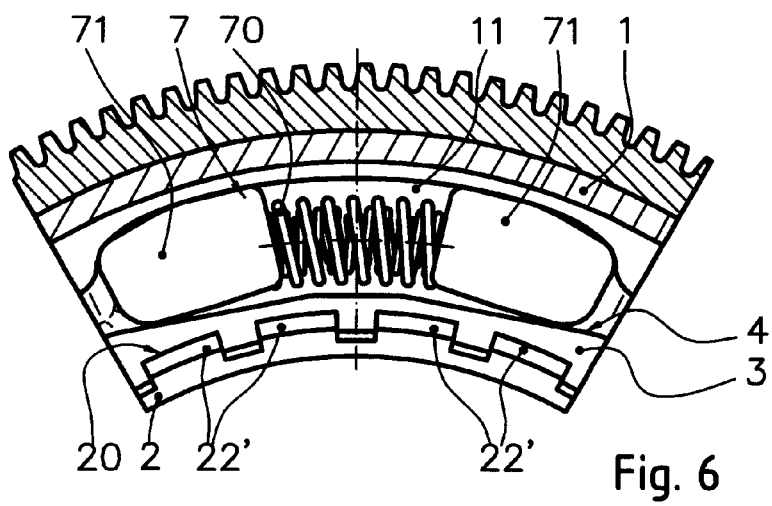
FIG. 6 is a sectional cutaway view of the torsional vibration damper, taken along the line VI in FIG. 5.
Figure 7:
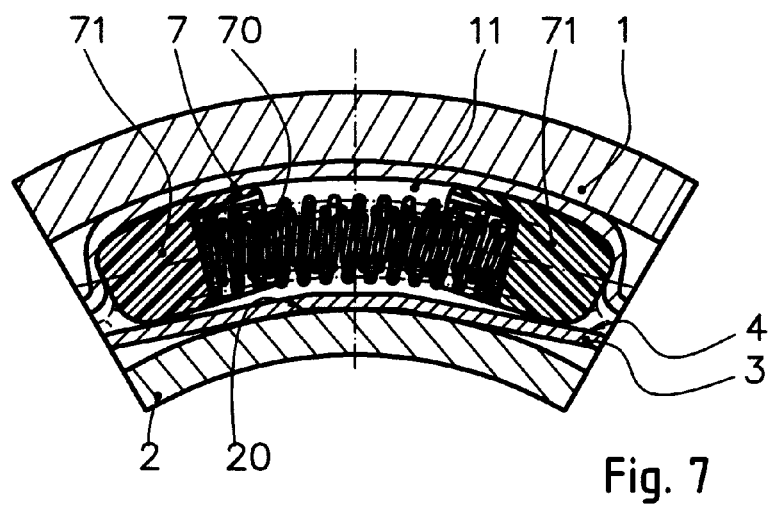
FIG. 7 is a sectional cutaway view of the torsional vibration damper, taken along the line VII in FIG. 5.
Figure 8:
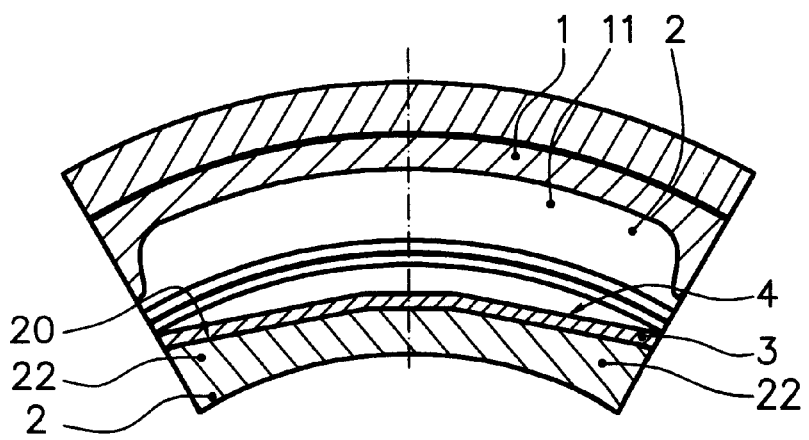
FIG. 8 is a sectional cutaway view of the torsional vibration damper, taken along the line VIII in FIG. 5.

FIGS. 3 and 4 show a second embodiment of a torsional vibration damper according to the present invention, which differs from the embodiment of FIGS. 1 and 2 by the provision of a plurality of circumferentially spaced projections 22 to support the contact ring 3. This ensures a partial contact in circumferential direction between the contact ring 3 and the secondary structural unit 2. The support surface 20 formed commonly by the projections 22 for radially supporting the contact ring 3 is also suited to the polygonal shape of the contact ring 3, so that the secondary structural unit 2 and the contact ring 3 are connected together with a positive fit effective in the circumferential direction.

In the embodiment shown in FIGS. 5 to 8, the contact ring 3 has an essentially L-shaped cross section in the axial direction. On its side facing the secondary structural unit 2, the contact ring 3 rests on projections 22, which vary in their axial thickness and, similar to the projection 22 of the structural unit 2 according to the first embodiment, have a shape complementing the polygonal shape of the contact ring 3. On its side facing away from the secondary structural unit 2, the contact ring 3 has a radial member which engages in spaced-apart projections 22' of the secondary structural unit 2, thereby forming meshing gear teeth to realize in conjunction with the positive fit between the projection 22 and contact ring 3 a positive fit effective in circumferential direction between the contact ring 3 and the secondary structural unit 2. The secondary structural unit 2 is provided in the area between the projections 22 and 22' with a cylindrical outer surface having a radius which corresponds to the smallest inside radius of the contact ring 3. In this way, the contact ring 3 rests between the projections 22 and 22' only in the area of the springs 70 on the secondary structural unit 2.

While the invention has been illustrated and described as embodied in a torsional vibration damper, it is not intended to be limited to the details shown since various modifications and structural changes may be made without departing in any way from the spirit of the present invention.

What is claimed as new and desired to be protected by letters patent is set forth in the appended claims:

1. A torsional vibration damper for use in a clutch, comprising a primary structural unit and a secondary structural unit frictionally engageable with a complementary component of a clutch, said primary and secondary structural units being rotatable relative to one another and connected to each other by a spring arrangement (7) including at least one thrust piston (71), with at least the secondary structural unit (2) interacting with the thrust piston (71) of the spring arrangement via a contact surface with a radially directed surface component, said contact surface (4) being formed on a separate third structural unit (3) situated between the secondary structural unit (2) and the spring arrangement (7) so that the second structural unit interacts with the spring arrangement via the third structural unit and an effective insulation of the spring arrangement from heat generated in the area of the frictional engagement of the secondary structural unit is realized, wherein the third structural unit (3) is so connected to the secondary structural unit (2) as to rotate with the secondary structural unit (2).

2. The torsional vibration damper of claim 1 wherein the third structural unit (3) is only in partial contact with the secondary structural unit (2).

3. The torsional vibration damper of claim 2 wherein the third structural unit (3) is in partial contact with the secondary structural unit (2) in an axial direction.

4. The torsional vibration damper of claim 2 wherein the third structural unit (3) is partially in contact with the secondary structural unit (2) in a peripheral direction.

5. The torsional vibration damper of claim 1 wherein the third structural unit (3) includes at least one plate-shaped element that rests on a corresponding support surface of the secondary structural unit.

6. The torsional vibration damper of claim 1 wherein the third structural unit (3) includes a contact ring (3).

7. The torsional vibration damper of claim 6 wherein the secondary structural unit (2) has a support surface that is smaller than the contact ring (3) in an axial direction.

8. The torsional vibration damper of claim 1 wherein the secondary structural unit (2) has a sup port surface (20) for supporting the third structural unit (3) in an essentially radial manner.

9. The torsional vibration damper of claim 1 wherein the third structural unit (3) is only placed on the secondary structural unit (2).

10. The torsional vibration damper of claim 1 wherein the third structural unit (3) is made of metal.

11. A torsional vibration damper for use in a clutch, comprising:

a primary structural unit;

a secondary structural unit frictionally engageable with a complementary component of a clutch, said primary and secondary structural units being rotatable relative to one another;

spring means disposed tangentially between the primary structural unit and the secondary structural unit for resiliently connecting the primary structural unit with the secondary structural unit, said spring means including at least a thrust piston; and a third structural unit positioned between the secondary structural unit and the spring arrangement to thereby insulate the spring arrangement from heat generated in the area of the frictional engagement of the secondary structural unit, said third structural unit defining a contact surface, with the secondary structural unit being so configured in a radial direction as to interact with the thrust piston of the spring arrangement via the third structural unit, wherein the third structural unit is so connected to the secondary structural unit as to rotate with the secondary structural unit.

12. The torsional vibration damper of claim 6 wherein the secondary structural unit (2) has circumferentially spaced-apart projections (22, 22') for support of the contact ring (3).

13. The torsional vibration damper of claim 1 wherein the third structural unit (3) and the secondary structural unit (2) are designed in such a way as to be connected to each other by a positive fit effective in a peripheral direction.

* * * * *